United States Patent
Geissler et al.

[11] Patent Number: 6,095,915
[45] Date of Patent: *Aug. 1, 2000

[54] PREMISE IDENTIFICATION SYSTEM

[75] Inventors: Randolph K. Geissler, Hudson, Wis.; D. Michael Fearing, Hastings, Minn.; William Battista, Madison, Wis.

[73] Assignee: Destron Fearing Corporation, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/020,785

[22] Filed: Feb. 9, 1998

Related U.S. Application Data
[60] Provisional application No. 60/054,134, Jul. 29, 1997.

[51] Int. Cl.[7] .................................................. A22B 5/00
[52] U.S. Cl. .............................................. 452/198; 40/301
[58] Field of Search ............................. 40/300, 301, 316; 452/198

[56] References Cited

U.S. PATENT DOCUMENTS

| | | |
|---|---|---|
| Re. 31,940 | 7/1985 | Ritchey . |
| 1,374,443 | 4/1921 | Giordano .................................. 40/301 |
| 3,388,492 | 6/1968 | Nichols, Jr. .............................. 40/301 |
| 3,826,030 | 7/1974 | Read ........................................ 40/301 |
| 4,059,074 | 11/1977 | Fürer et al. . |
| 4,209,924 | 7/1980 | Fearing .................................... 40/301 |
| 4,359,015 | 11/1982 | Ritchey . |
| 4,379,372 | 4/1983 | Alexander et al. .................. 40/316 X |
| 4,471,546 | 9/1984 | Bolling, Jr. ............................... 40/301 |
| 4,537,150 | 8/1985 | Bowers ............................... 40/300 X |
| 4,646,455 | 3/1987 | Gardner ............................... 40/300 X |
| 4,674,445 | 6/1987 | Cannecongo . |
| 4,694,781 | 9/1987 | Howe et al. . |
| 4,816,374 | 3/1989 | Lecomte . |
| 5,016,369 | 5/1991 | Parry ....................................... 40/301 |
| 5,024,013 | 6/1991 | Hayes et al. ........................... 40/301 |
| 5,189,986 | 3/1993 | Burkoth ................................. 119/156 |
| 5,308,351 | 5/1994 | Nehls .................................. 40/300 X |
| 5,461,805 | 10/1995 | Johnson .............................. 40/300 X |
| 5,473,830 | 12/1995 | Doble ...................................... 40/301 |
| 5,478,990 | 12/1995 | Montanari et al. ................... 235/375 |
| 5,667,515 | 9/1997 | Chu ................................... 40/300 X |
| 5,741,177 | 4/1998 | Roberts et al. ........................ 452/198 |

FOREIGN PATENT DOCUMENTS

| | | | |
|---|---|---|---|
| 2174040 | 10/1986 | United Kingdom | .................... 40/301 |

*Primary Examiner*—Willis Little
*Attorney, Agent, or Firm*—Jacobson & Johnson

[57] ABSTRACT

An animal tracing system having a parasitic premise information panel for attachment to the stud of an ear tag for use in determining the history and origins of an animal after the animal has been slaughtered, the premise information panel contains a bar code and a numeric code to reveal an animal's history and origin, the panel having sufficient strength to remain attached to the identification panel in day-to-day wear but of sufficient weakness so that a user can remove the premise information panel from the animal ear tag without removing the ear tag from the animal carcass and, along with a blood sample, store the panel therewith until a later date, at which time the premise identification information can be referred to a blood test reveals that the animal has a disease. The tainted carcass can be quickly identified by cross-referencing the premise information panel to the ear tag remaining on the carcass.

3 Claims, 5 Drawing Sheets

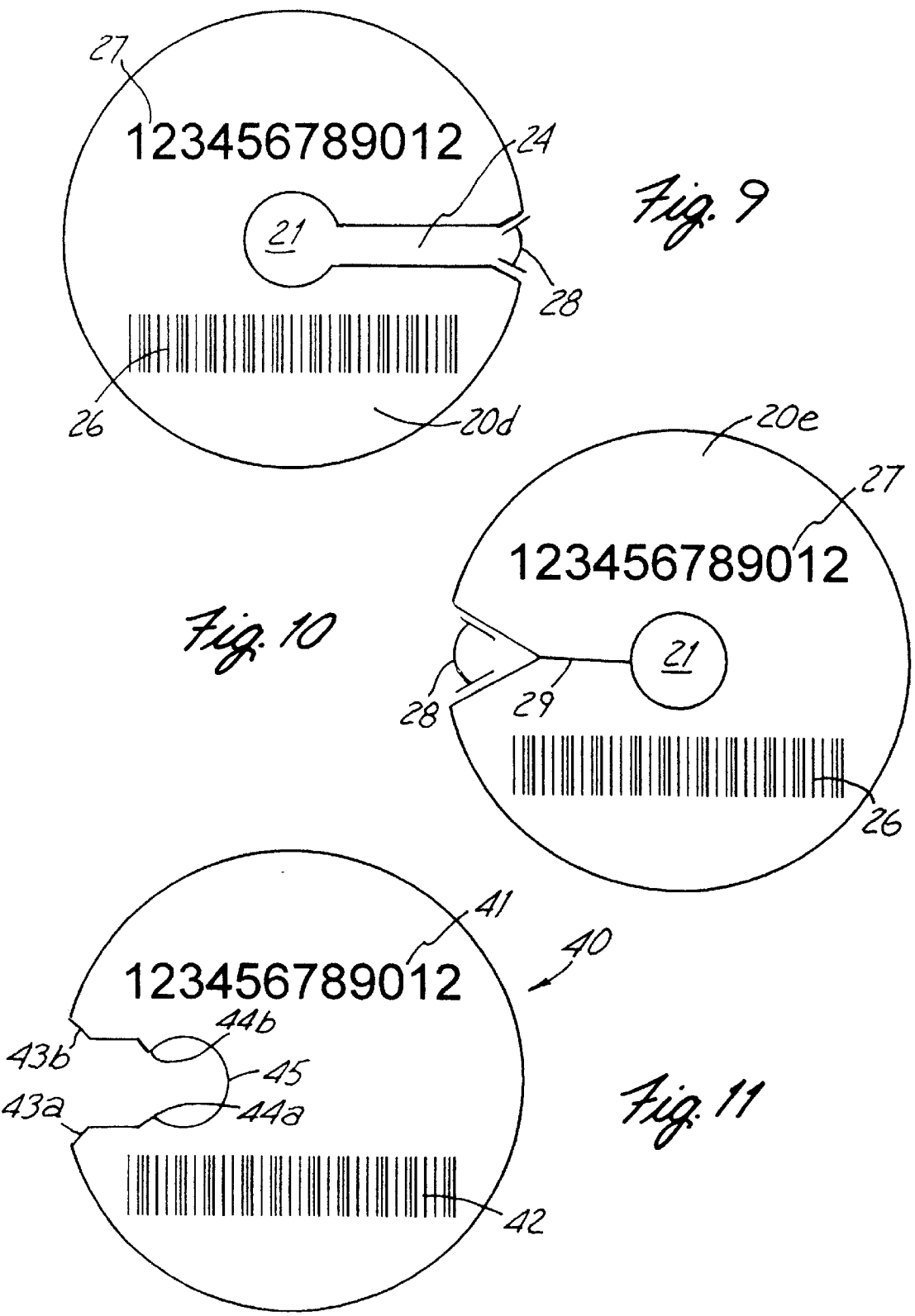

PREMISE IDENTIFICATION SYSTEM

CROSS REFERENCE TO RELATED APPLICATIONS

This application claims benefit U.S. provisional patent application 60/054,134 filed on Jul. 29, 1997.

FIELD OF THE INVENTION

This invention relates generally to animal tracing systems, and more specifically, to animal tracing system having a detachable parasitic information panel.

BACKGROUND OF THE INVENTION

The use of plastic elastomeric ear tags for the purpose of identifying animals, especially livestock such as cows and hogs, has become a common practice. Traditionally, both one and two-piece ear tags have been used to help farmers and ranchers identify their own livestock. Once a livestock animal is slaughtered however, there is no current practical way to trace the animal's origin.

As more attention is brought to bear on calamities such as "Mad Cow Disease", it is apparent that diseased animals need to be quickly identified to prevent contaminated meat from getting into the general food supply. One of the difficulties encountered is the inability to quickly trace where the diseased animal came from during the slaughtering process, and whether all infected animals have been found.

The present invention provides an animal tracing system having a premise information panel and a method that permits the animal slaughterhouse to quickly determine where a diseased animal originated from by reference to a human separable premise information panel that carries historical information on the origin of the animal. In addition, since the separable premise information panel also contains animal identifying information that corresponds to the animal identifying information on an identification panel which is left on the carcass during slaughter of the animal, one can cross reference the two parts to quickly identify the carcass associated with the premise identification panel even though the premise information panel has been separated from the slaughtered animal.

It is known in the art to have attachments to animal ear tags to hold insecticides. The attachments include both a carrier and an insecticide located within the carrier. For example, the prior art U.S. Pat. No. 4,059,074 includes a circular disk having a radial slot which attaches to the stud of an ear tag. The disk is made from a sintered thermoplastic and is impregnated with an insecticide which is effective against ticks. The sintered thermoplastic carrier allows the insecticide to be released from the sintered thermoplastic disk over an extended period of time. Similarly, U.S. Pat. No. 4,694,781 includes a container which attaches to an animal ear tag with the container having a sponge therein with the sponge being filled with an insecticide.

It is also known in the art to have the main panel of an animal ear tag separable in response to snagging. For example, Fearing U.S. Pat. No. 4,209,924 discloses an identification panel with a weakened portion that will tear away if the animal's ear becomes snagged on brush or the like. An identification number is carried on both the severable section of the panel and the non-severable section of the panel.

In contrast to the prior art insecticide carriers, the present invention provides a second, separate, solid non-porous, information panel for parasitic attachment to the stud of an ear tag, with the second separate information panel having a visible information area which contains printed historical information such as the location of where the animal came from as well as a cross-reference to the animal identification panel on the animal ear tag. In contrast to an ear tag, as shown in prior art Fearing U.S. Pat. No. 4,209,924 which has a single tearable panel with identification numbers on two regions of the tearable panel, the premise information panel of the present invention is a separate panel from the identification panel and is separable from the stud in response to human intervention. To prevent loss of the present invention due the snagging the present invention can be located in a protected position on the animal ear tag so as to minimize accidental loss due to snagging.

The premise information panel is referred to herein as a parasitic panel because it requires no additional stud as it attaches to the stud of an existing ear tag without the use of a separate stud. It is further identified as a premise information panel because it contains historical information in bar code form or the like that can be used to determine the origin of the animal. In addition, the premise information panel can be attached or detached from an animal ear tag without damaging the ear tag as the premise information panel is sufficiently weak to enable separation, yet sufficiently strong so that separation does not deface the area containing the historical information, rendering it unreadable.

DESCRIPTION OF THE PRIOR ART

U.S. Pat. No. 3,388,492 shows an identification panel with a pivoting internally contained stud to prevent hole enlargement in an animal's ear.

U.S. Pat. No. 3,826,030 shows an identification panel with tags pivotable about the center stud.

U.S. Pat. No. 4,059,074 shows a disk for attachment to an ear tag to control ear ticks on an animal.

U.S. Pat. No. 4,359,015 shows an hourglass-shaped identification panel to facilitate the healing process after the initial piercing.

U.S. Pat. No. 4,471,546 shows an identification tag kit utilizing a small needle which is entirely covered after piercing to prevent harm to the animal.

U.S. Pat. No. 4,694,781 shows a container for attachment to identification panels which may contain insecticide, repellents, drugs or a radio transmitter.

U.S. Pat. No. 5,016,369 shows an ear tag assembly system that release a sterilizing substance into the piercing wound automatically after the piercing has been completed.

U.S. Pat. No. 4,209,924 discloses an animal ear tag with a severable identification panel to prevent injury to an animal's ear.

U.S. Pat. No. 4,816,374 discloses an animal ear tag marked with both arabic numerals and a bar code.

SUMMARY OF THE INVENTION

Briefly, the present invention comprises an animal tracing system having a parasitic premise information panel for attachment to an ear tag for use in determining the history and origins of an animal after the animal has been slaughtered, the panel contains a bar code and a numeric code to reveal an animal's history, the panel being attached to an existing stud in an ear tag, with the panel having sufficient strength to remain attached to the identification panel in day to day wear but of sufficient weakness so that a person may remove the premise information panel from the ear tag and, along with a blood sample, store the premise information panel therewith to identify the blood sample and to provide a means of determining the animal from which the blood sample came.

BRIEF DESCRIPTION OF THE DRAWINGS

FIG. 9 is a front view of an alternate embodiment of the premise information panel with a stud channel and alignment wedge.

FIG. 10 is a front view of an alternate embodiment of the premise information panel with a full-sliced radius and alignment wedge, and FIG. 11 is a plan view of a further embodiment of the invention.

DESCRIPTION OF THE PREFERRED EMBODIMENT

Figure 1:
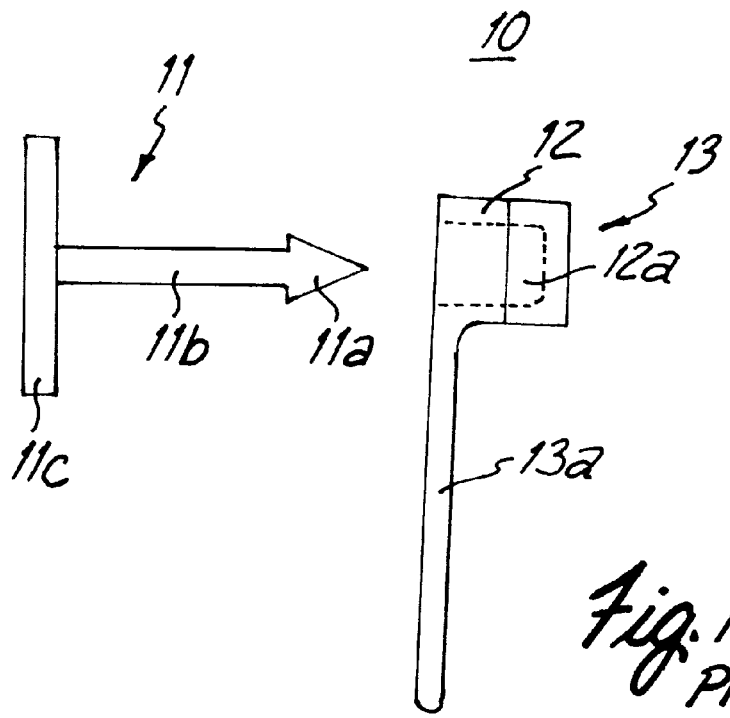
FIG. 1 is a side view of a prior art identification panel and stud.
Figure 2:
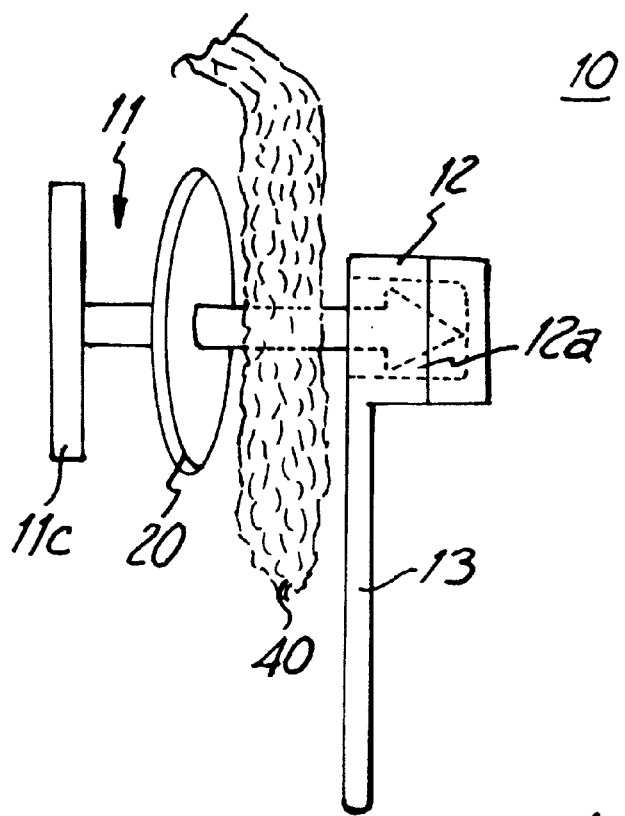
FIG. 2 is a side view of the identification panel and stud of FIG. 1 with a parasitic premise information panel located on the stud.
Figure 3:
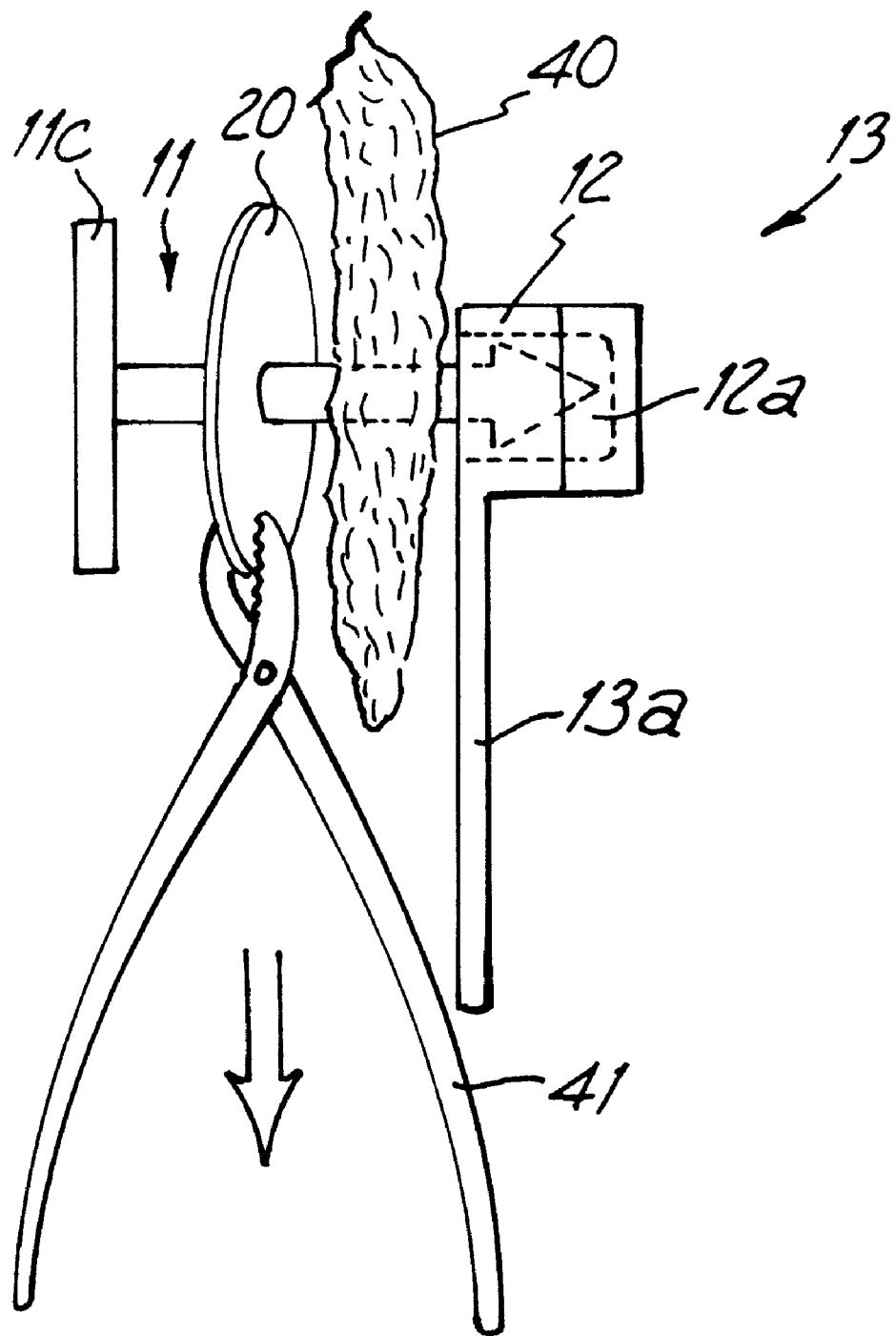
FIG. 3 is a side view of the identification panel, stud, and premise information panel about to be removed from the stud.

Referring to FIGS. 1 through 3, reference numeral 10 generally identifies a two piece generic animal ear tag well known in the art consisting of an identification panel 13 and a stud 11. The identification panel 12 contains a large area 13a upon which identification information about an animal can be placed. The stud 11 and identification panel 13 are generally made from a soft, pliable material such as polyurethane to facilitate durability of the device while at the same time assuring flexibility.

FIG. 1 specifically shows an ear tag 10 in an open state, that is, in an unused condition. The ear tag 10 includes an identification panel 13 with a boss 12, having a recessed area 12a for insertion of a stud tip 11a therein. To assemble, the stud tip 11a is forced through the ear of an animal into the recessed area 12a of the boss 12 by means of an ear tag attachment device. The base 11c of stud 11 remains on one side of the ear of an animal 40, while a stud shaft 11b pierces the animal ear 40 and stud tip 11a locks inside of recessed area 12a. The identification panel 13 contains a large area 13a which can carry a numeral that an observer can easily identify from a distance.

FIG. 2 shows the animal ear tag 10 of FIG. 1, with a parasitic premise information panel 20 of the present invention which is mounted on stud shaft 11b before the installation of ear tag 10 on an animal. Parasitic premise information panel 20 is made from a solid thermoplastic material such as PVC. That is, using an ear tag attachment device, the stud 11 which carries premise information panel 20 is engaged with identification panel 13 during the tagging process. Note that the top of premise information panel 20 is sufficiently large to extend slightly above the base 11c of stud 11 to facilitate determination of the presence of the premise information panel 20 by a viewer from a distance. However, premise information panel 20 does not protrude so far that it interferes with normal functioning of stud 11.

FIGS. 2 and 3 show the animal tracing system which includes a fully assembled ear tag 10 with the premise information panel 20 centrally located on stud shaft 11b, and the stud tip 11a implanted securely into recessed area 12a. Premise information panel 20 is nestled in a protected region between the animal's ear 40 and one portion of the animal ear tag. A primary function of the present invention is to allow a user to identify where an animal came from after it has been slaughtered. After an animal is killed, a person can use a tool such as a pliers 41 to forcibly tear premise information panel 20 from stud shaft 11b. The premise information panel 20 can be sent, along with a blood sample, to a testing area. The premise information panel 20, which will accompany the blood samples, will provide information on the origin of the animal as well as a cross reference to the animal identification tag that remains on the animal. That is, the animal ear tag 10, including stud 11 and identification panel 13 stays with the carcass of the animal and remains attached at the ear 40, so that those who process the carcass can quickly identify which animal the blood sample came from if a blood test reveals a diseased animal.

Figure 4:
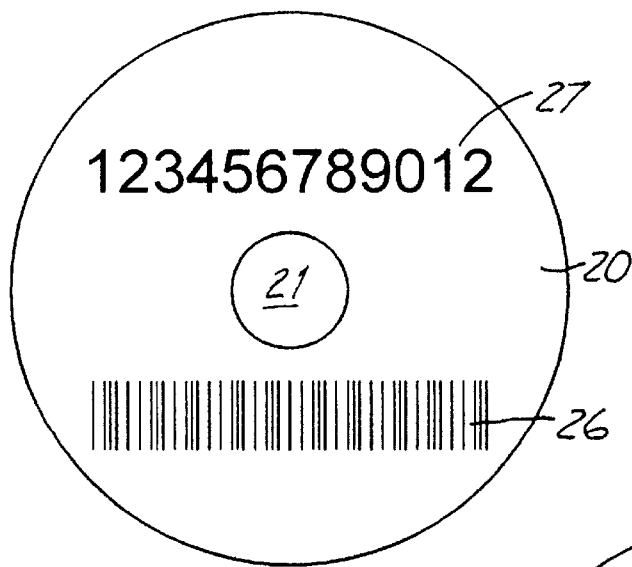
FIG. 4 is a front view of a preferred embodiment of a premise identification panel.

FIG. 4 shows a preferred embodiment of the premise information panel 20 for application to an animal when the ear tag is installed Premise information panel 20 comprises a semi-rigid smooth circular disk having a thickness of about 0.020 inches and an outside diameter of about 1 and ½ inches with a center hole 21 which fits onto a stud, a printed bar code 26 which discloses information about the animal including its history and origin is included on one the face of panel 20, and a printed numeric code 27 which also contains information corresponding to the identification information on the panel of the ear tag. The tear region is positioned between the bar code and the numbers so that removal of the premise identification panel will not damage either the printed bar code or the numeric code.

The embodiment of FIG. 4 is used as follows. A handler who wants to record the origin of their animals, uses an ear tag attachment device to pierce an animal ear 40, inserting the stud 11 therethrough. To begin the process, one places the premise information panel 20 with central hole 21 over the stud shaft 11b. A user then attaches the identification panel 13 to the stud 11 by inserting the stud tip 11a through the animal's ear and into the recessed area 12a. The large area 13a contains a numeral to allow a user to identify the animal in the field. The premise information panel 20, although nestled on the stud of 11 animal ear tag 10, has a portion which is sufficiently larger than the stud base 11c so that a person may quickly recognize which animals have a premise information panel 20, and which animals do not. After the animal is slaughtered, one can use a common set of pliers 41 to pull the premise information panel 20 off of stud shaft 11b. The premise information panel 20 is comprised of a material sufficiently strong and flexible so that it remains attached to the stud 11 throughout the life of the animal, and sufficiently weak so that a user may remove the panel 20 with a reasonable amount of force but without destroying panel 20 or the information thereon. When the animal tracing system is in operation, the animal ear tag 10 stays attached to the animal ear 40, while the premise information panel 20 along with a sample of blood, is removed and stored until such time that it is deemed that the animal's history no longer be known. However, if the blood test indicates disease, a person can quickly identify the carcass by cross referencing the information on the premise information panel 20 to the animal identification panel 13. Thus, the premise information panel 20 provides an inexpensive, easy-to-use device that allows for tracking animals used in consumer products.

Figure 5:
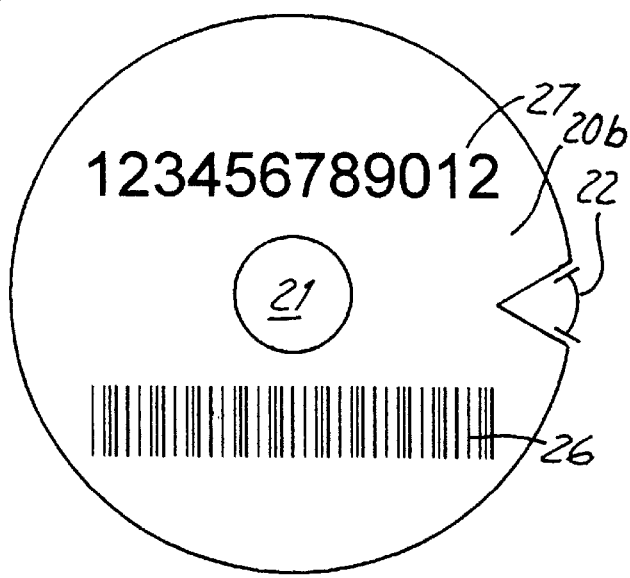
FIG. 5 is a front view of an alternate embodiment of the premise information panel with a starter wedge.
Figure 6:
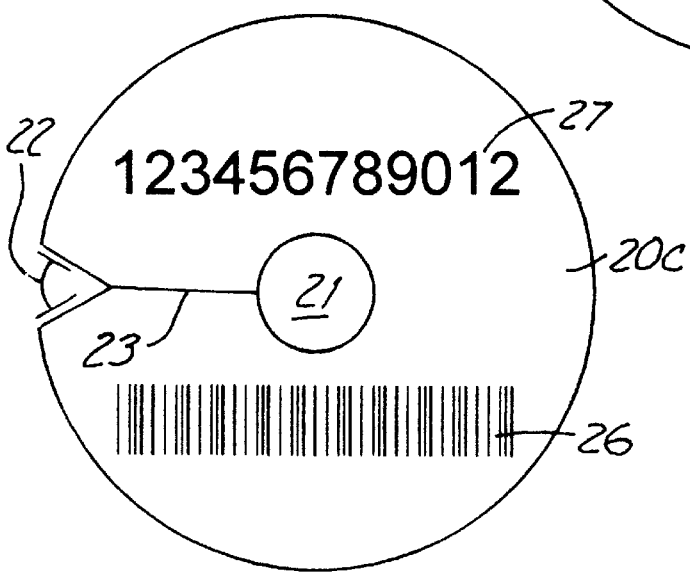
FIG. 6 is a front view of an alternate embodiment of the premise information panel with a perforation located along a radius and a starter wedge.

FIGS. 5 and 6 show alternate embodiments of the premise information panel 20b, 20c, which are to be attached to an animal when the animal ear tag 10 is first applied. In FIG. 5, premise information panel 20b has a numeric code 27 and a bar code 26. In contrast to panel 20 in FIG. 4, panel 20b also includes a starter wedge 22. The purpose of starter wedge is to facilitate easier removal of the panel from an animal carcass. The starter wedge 22 provides a starting point for a user. With this embodiment, the removal is facilitated through the notch weakened area.

FIG. 6 shows a further embodiment of a premise information panel 20c which contains a numeric code 27, a bar code 26, a perforation along radius 23, and a starter wedge 22. The perforation cut is scored or intermittently cut along the radius 23 of the premise information panel 20c. This embodiment of premise information panel 20c is removable from a carcass in a similar manner to premise information panel 20b. A user grasps the edges of starter wedge 22 and tears along radius 23 toward the center hole 21. The starter wedge 22 clearly identifies the location of the perforation radius 23 so that a user may know exactly where to tear without damaging the information on the panel. Once the premise information panel 20c is ripped along radius 23, a user may easily remove the panel 20c from a stud shaft 11b. The premise information panel 20c a long with a blood sample is then sent for testing.

Figure 7:
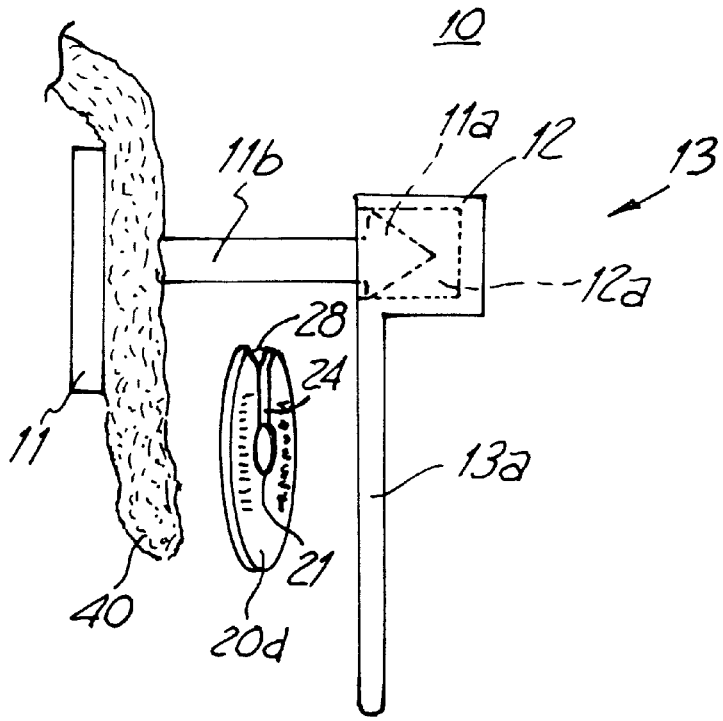
FIG. 7 is a side view of an alternate embodiment of the premise information panel which is about to be attached to an identification panel.

FIG. 7 and FIG. 9 show an alternate embodiment of the premise information panel 20d which can be attached to an animal ear tag 10 after the animal has been tagged. Stud 11 contains stud shaft 11b which traverses through animal ear 40 and connects to the identification panel 12 by means of the stud tip 11a being firmly implanted into recessed area 12a. The premise information panel 20d contains a stud channel 24 and a starter wedge 28. To attach premise information panel 20 the starter wedge 28 is placed against the stud shaft 11b and pushed towards the stud shaft 11b. The starter wedge 28 serves to align or guide the premise information panel 20d onto the stud shaft 11b, whereon the stud shaft 11b travels along the stud channel 24 to the center hole 21 (See FIG. 8). Note that the stud channel 24 is sufficiently smaller than the stud shaft 11b, so that the premise information panel 20d will have to bend slightly to allow the stud shaft 11b along the stud channel 24. When the stud shaft 11b reaches the end of the stud channel 24, the stud shaft 11b snaps into tight arrangement with the center hole 21 to keep the premise information panel 20d securely fastened to the animal ear tag 10. Note that the premise information panel 20d can be installed on either side of the ear, but when installed, it remains protected from external objects by either the ear or the ear tag.

Figure 8:
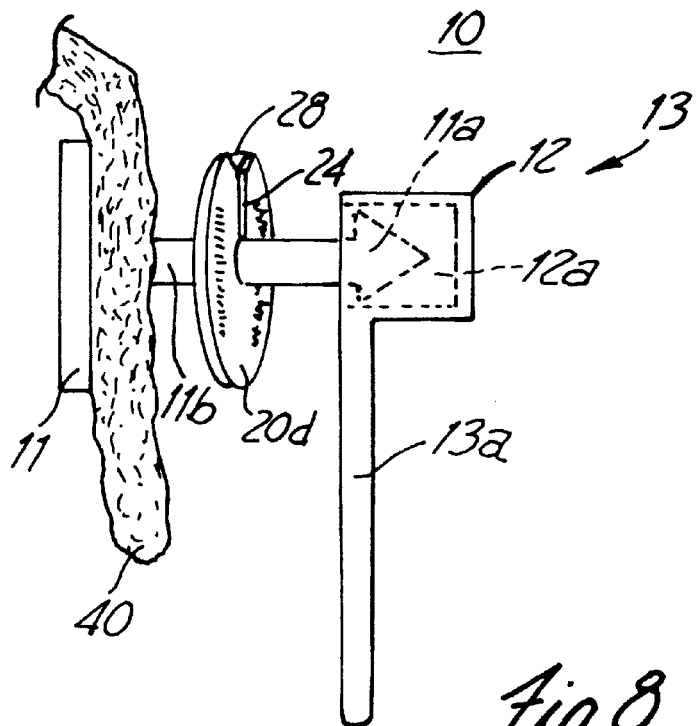
FIG. 8 is a side view of the alternate embodiment of FIG. 7 of the premise information panel which has been attached to an identification panel.

FIG. 8 shows the premise information panel 20d in a secure arrangement with the stud shaft 11b. Note that a user can clearly see the presence of the premise information panel 20d even though it is partially obstructed by panel 13. The premise information panel 20d is sufficiently strong as to resist the wear and tear of day to day animal life, and sufficiently rigid to stay attached to stud shaft 11b, but also sufficiently flexible so that a user can with some effort, flex the premise information panel 20d and remove it from a carcass by sliding the identification panel off stud shaft 11b, along stud channel 24 and exiting through alignment wedge 28. The premise information panel 20d is therefore removed along with a blood sample and kept with the blood sample until needed to provide the animal's history, while the ear tag 10 travels with the carcass of the animal to later assist personnel in identifying the animal if disease should be found in the blood of the animal.

FIGS. 9 and 10 generally indicate alternate embodiments of the premise information panel 20 that can be attached to an animal after the animal has been tagged. FIG. 9 shows a premise information panel 20d with a bar code 26, a numeric code 27, a center hole 21, a starter wedge 28, and a stud channel 24. Stud Shaft 11b is placed against starter wedge 28, and runs along stud channel 24 until stud shaft 11b securely wedges into center hole 21. The premise information panel 20d can be removed by reversing the process.

FIG. 10 shows an alternate embodiment of the premise information panel 20e. The panel 20e contains a bar code 26, a numeric code 27, a starter wedge 28, a full cut along radius 29 forming a radial slot and a center hole 21. The premise information panel 20e can be placed onto an existing ear tag system 10 by placing the stud shaft 11b into the starter wedge 28, sliding the stud shaft 11b along the full-cut radius 29 and into the center hole 21. The full-cut radius 29 is a cut that completely penetrates the premise information panel 20e. The premise information panel 20e is sufficiently flexible to allow the stud shaft 11b through the full-cut radius 29 if sufficient force is used, and sufficiently rigid to prevent the premise information panel 20e from slipping off of the animal in day-to-day wear.

The type of premise information panel used will be determined when the premise information panel is attached; i.e., before or after the animal has been tagged. The type of premise information panel will also be determined by the conditions encountered by the animal; i.e., is a premise information panel applied months before shipping the animal to slaughter or is it applied immediately before shipping the animal to slaughter? In the latter case, the premise information panel need not have high retention since it is unlikely that the animal will lose its premise identification during shipping. The embodiments of FIG. 9 and FIG. 10 are well suited for tag attachment after the ear tag has been installed in the animal whereas the embodiment of FIGS. 4, 5, and 6 are suitable for attaching to the animal ear tag when an ear tag is applied to the animal.

Premise identification panels can be made from material such as polyvinyl chloride or other materials that have sufficient flexibility to flex if the animal should snag the tag on brush or the like. A circular premise information panel having a diameter less than two-inches and thickness of approximately 0.015 inches is suitable for most applications; however, other shapes could be used. To enhance visibility of the premise information panel from the animal identification panel, the premise information panel can be made from a material having a different color than the animal ear tag.

FIG. 11 shows a further embodiment of the invention comprising a premise identification panel 40 having a first surface area with animal identification information 41 thereon and a second area having bar coded information 42 thereon. The premise identification panel 40 has an oval shape with opposed guide surfaces 43a and 43b to direct the panel around the shaft of a stud. A first neck 44a and a second neck 44b project inward to form a portion of a circular enclosure with surface 45 that can be engaged with the circular shaft of a stud by flexing the ears to extend the ears around the shaft of the stud. In normal operation, the necks 44a and 44b extend outward to hold the premise identification panel 40 on the shaft of stud of an animal ear tag.

In summary, the method of tracing an animal that is slaughtered using the premise identification panel in conjunction with an animal ear tag comprising the steps of:
1. Placing an animal ear tag with a stud and an identification panel on an animal.
2. Placing a parasitic information panel on the stud with the parasitic information panel having historical information thereon and animal identification information thereon
3. Slaughtering the animal;
4. Taling a blood sample from the animal;
5. Removing the parasitic information panel from the ear tag while leaving the animal ear tag on the slaughtered animal and sending the parasitic animal information panel with the blood sample to be stored;
6. Testing the body sample to determine if the slaughtered animal is diseased;
7. If the body test determines the slaughtered animal is diseased, using the parasitic information panel to locate where the diseased animal originated from by reference to the historical information;
8. Comparing the animal identification information to the ear tag left on the slaughtered animal to the historical information to determine which slaughtered animal has a disease; and
9. Removing the slaughtered animal from processing to prevent human consumption of the slaughtered animal Thus, the present invention presents a three piece animal tracing system for carrying information that is to be separated when an animal is slaughtered. The animal tracing system including an identification panel, a stud with a shaft having an intermediate section and a base on one end to prevent withdrawal of the stud. The stud has an opposite end for forming locking engagement with the identification panel with the identification panel and the base coacting to prevent withdrawal of the stud from an animal's ear. Mounted on the intermediate section of the stud shaft is a one piece severable panel, having an area for carrying historical information. The panel is characterized by having a region sufficiently weak to permit removal of the one piece severable panel therefrom without destroying the historical information thereon. The one piece severable panel is also sufficiently strong to prevent the one piece panel from becoming accidentally detached.

The present invention also provides animal origin tracing device comprising a parasitic separable premise information panel 20 for temporary attachment to an animal ear tag with separable premise information panel 20 having a first surface area 27 with animal identification information thereon that is cross referenceable to other animal identification devices. The parasitic premise information panel comprised of a solid non-porous polymer such as PVC which is sufficiently flexible so as to flex and bend in response to physical engagement therewith. The premise information panel 20 has a second surface area containing information 26 on a where an animal was raised so that the parasitic separate premise information panel can be used to determine the identify of an animal as well as where the animal originated from.

We claim:

1. The method of tracing an animal that is slaughtered comprising the steps of:

placing an animal ear tag with a stud and an identification panel on an animal;

placing a parasitic information panel on the stud with the parasitic information panel having historical information thereon and animal identification information thereon;

slaughtering the animal;

taking a body sample from the animal;

removing the parasitic information panel from the ear tag while leaving the animal ear tag on the slaughtered animal and sending the parasitic animal information panel with the blood sample;

testing the body sample to determine if the slaughtered animal is diseased;

if the body test determines the slaughtered animal is diseased using the parasitic information panel to locate where the diseased animal originated from by reference to the historical information;

comparing the animal identification information to the ear tag left on the slaughtered animal to the historical information to determine which slaughtered animal has a disease; and removing the slaughtered animal to prevent human consumption of the slaughtered animal.

2. The method of claim 1 wherein the body sample is a body fluid sample.

3. The method of claim 1 wherein the body sample is a blood sample.

* * * * *